No. 637,992. Patented Nov. 28, 1899.
L. T. JONES, Jr.
ELECTRIC LOG RECORDER.
(Application filed Aug. 4, 1899.)
(No Model.)

Witnesses,

Inventor,
Levin T. Jones Jr.
By Dewey Strong & Co.
atty

UNITED STATES PATENT OFFICE.

LEVIN T. JONES, JR., OF SAN FRANCISCO, CALIFORNIA.

ELECTRIC LOG-RECORDER.

SPECIFICATION forming part of Letters Patent No. 637,992, dated November 28, 1899.

Application filed August 4, 1899. Serial No. 726,096. (No model.)

*To all whom it may concern:*

Be it known that I, LEVIN T. JONES, Jr., a citizen of the United States, residing in the city and county of San Francisco, State of California, have invented an Improvement in Electric Log-Recorders; and I hereby declare the following to be a full, clear, and exact description of the same.

My invention relates to a device which is especially designed to transmit the record and registration of a log used in determining the speed of vessels to the pilot-house, chart-room, or other desired point or points, so that the record may be instantly and continuously before the navigator.

It consists of the parts and the constructions and combinations of parts hereinafter described and claimed.

Figure 1:
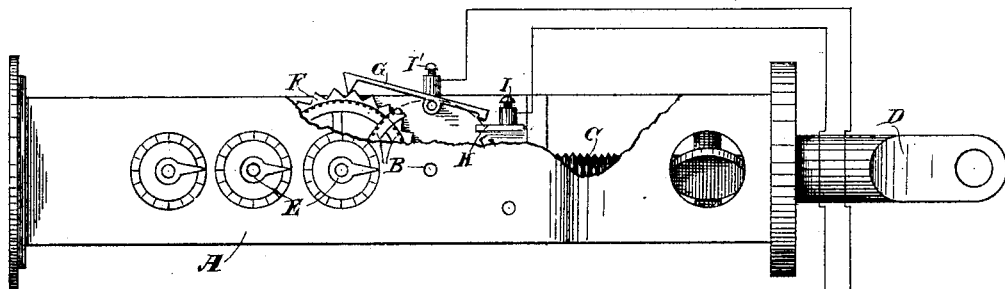
Figure 2:
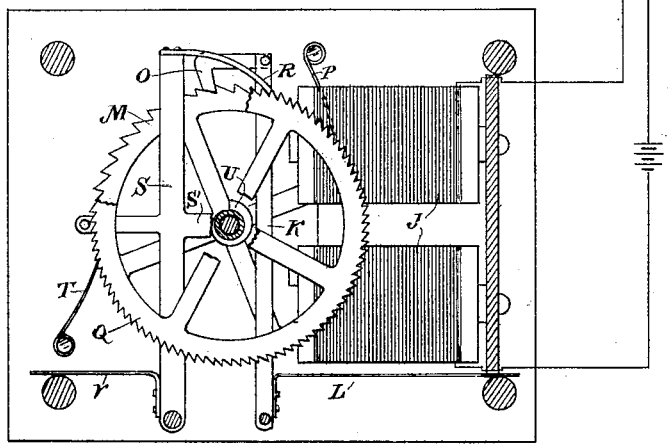
Figure 2:
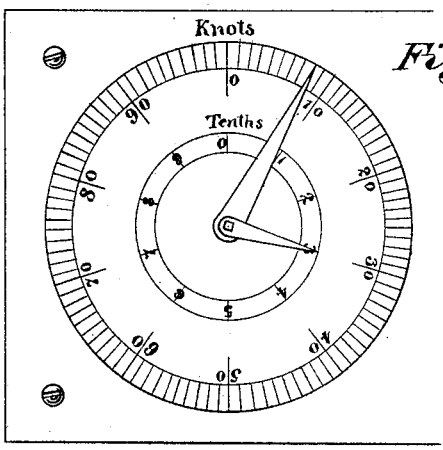
Figure 3:
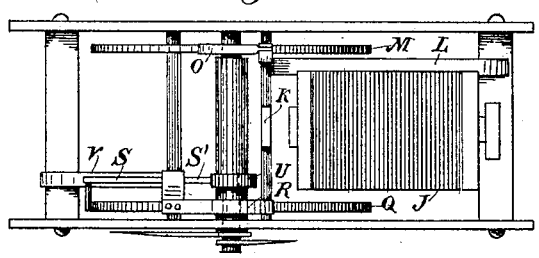

Referring to the accompanying drawings, Figure 1 is a general view of my recorder. Fig. 2 is a view of the face. Fig. 3 is a top view of the recorder.

In the use of what is known as the "taff-rail-log" the indicating apparatus is usually fixed to a support projecting outside of the taffrail, so as to carry the log-propeller out of the wake of the vessel, and in order to inspect the recording devices it is necessary to bring the apparatus in to the side of the vessel. The result of the inspection must then be transmitted to the navigator, who will usually be at a considerable distance away in the chart-room near the head of the vessel, and this, especially in large vessels, occupies much valuable time, which in critical situations it is dangerous to lose.

The object of my invention is to instantly transmit the record of the log to the chart-room or other desired point where it is to be used.

A is a framework containing the intermeshing gears and pinions B, which are suitably journaled therein and which are connected by a worm-shaft C with the rotatable stem D, this deriving its movement from a propeller which is dragged through the water at a sufficient distance behind the vessel and which by its rotations moves the mechanism within the frame A, and this mechanism again acts upon the indicators E to record the distance the vessel has moved through the water. These devices are well known and need no further description at this point.

In my invention I connect with the shaft of one of the indicators a toothed wheel F, which is carried by said shaft. The teeth of this wheel act upon an arm of a lever G, suitably fulcrumed, as shown, and this lever is alternately raised by passing over the point of a tooth and then drops into space between the next two by gravitation or by the pressure of a spring coiled around its fulcrum or otherwise arranged. When the lever is thus raised by passing over the point of a tooth, it forms a contact with a conducting-arm H, and this arm is connected with an electric conductor through a binding-post I. The arm G is also connected with another binding-post I', so that when a contact is momentarily made between G and H an electric circuit is established. As soon as the arm G is released from the tooth of the wheel F it drops into the next adjacent notch of the wheel F and breaks contact.

The electrical circuit is connected with the coil forming the electromagnet J, and when energized this electromagnet acts upon a fulcrumed armature K to draw it toward the magnet. When the electrical circuit is broken, the armature is returned to its normal position by the action of a spring L.

M is a ratchet-wheel suitably journaled with relation to the armature K, and O is a pawl fulcrumed to the armature, so as to engage the teeth of the ratchet M, and when the armature is attracted by the electromagnet this pawl acts to move the ratchet-wheel M forward a single tooth. This movement takes place with each making and breaking of the electric circuit by the lever-arm G, previously described, so that the wheel M is revolved in unison with the revolution of the wheel F, and this wheel F being mounted upon the same shaft with one of the indicators E, which records a certain distance traveled by the vessel, it will be manifest that the same record will be made by the revolution of the wheel M at the point distant from the log-recording apparatus.

The pawl O serves to advance the wheel M, and the stop-pawl P prevents its moving backwardly.

Journaled upon the same shaft with the wheel M, as here shown, is a second ratchet-wheel Q.

R is a pawl carried by a fulcrumed lever S, having its point engaging the teeth of the wheel Q, and T is a stop-pawl to prevent the return of this wheel after a forward movement. The lever S has a projection S' or is otherwise so arranged as to be actuated by a cam U, carried by the ratchet-wheel M. This cam acts to raise the fulcrum-lever S when the highest portion of the cam has passed beneath it, and this moves the pawl R to engage with a new tooth of the ratchet-wheel Q. When the lever S is disengaged from the cam U, it is actuated by the spring V, which causes it to return to its normal position, and through the pawl R the wheel Q is thus advanced a single tooth for each full revolution of the wheel M. The wheels M and Q are mounted upon hollow and solid shafts, as shown in Figs. 1 and 3, and the hands or pointers 20 22 are fixed to these shafts and operate over the dials 23 24, one of which is shown as graduated into knots and the other into tenths of knots, as illustrated in Fig. 2.

In this manner the record of the log is continuously and simultaneously transmitted to the chart-room or other distant point where it is desired to inspect it, and the record is always before the proper officer without any loss of time otherwise required to inspect the log-record itself and report its condition.

It will be understood that the mechanism may be actuated by either a normally-open circuit or a normally-closed circuit, and it is intended in this specification and claim that the words "open" or "closed" shall be interchangeable, so far as producing the results desired.

Having thus described my invention, what I claim as new, and desire to secure by Letters Patent, is—

The combination with a log and the registering apparatus thereof, and a make-and-break mechanism carried by the log, of a distant counting mechanism consisting of an electromagnet and connections between it and the make-and-break mechanism, concentric shafts, ratchet-wheels thereon and spaced from each other so as to operatively receive between them the electromagnet, a spring-pressed fulcrumed lever at one side of the shaft and provided with a pawl to engage one of said ratchet-wheels, said lever being proximate to and serving as the armature for the electromagnet, a second fulcrumed and spring-pressed lever on the opposite side of the shaft and having a pawl to operatively actuate the other ratchet-wheel, a cam on one of said shafts and adapted to engage said second lever, stop-pawls for said wheels, a dial having inner and outer circles, one graduated into knots and the other into fractions thereof, and pointers adapted to move over said circles and indicate the speed of the vessel.

In witness whereof I have hereunto set my hand.

LEVIN T. JONES, JR.

Witnesses:
 S. H. NOURSE,
 JESSIE C. BRODIE.